(12) United States Patent
Hill (10) Patent No.: US 7,045,196 B1
(45) Date of Patent: May 16, 2006

(54) PACKAGING LAMINATE AND METHOD

(75) Inventor: Jerry L. Hill, Oak Ridge, NC (US)

(73) Assignee: Quality Packaging Corporation, High Point, NC (US)

( * ) Notice: Subject to any disclaimer, the term of this patent is extended or adjusted under 35 U.S.C. 154(b) by 0 days.

(21) Appl. No.: 10/429,566

(22) Filed: May 5, 2003

(51) Int. Cl.
*B32B 3/28* (2006.01)
*B32B 3/30* (2006.01)

(52) U.S. Cl. ............... 428/183; 428/137; 428/184; 428/185

(58) Field of Classification Search ........... 428/182, 428/183, 184, 185, 136, 137
See application file for complete search history.

(56) References Cited

U.S. PATENT DOCUMENTS

| | | | | |
|---|---|---|---|---|
| 2,042,586 A | * | 6/1936 | Campbell et al. | 428/102 |
| 2,284,663 A | * | 6/1942 | Kieffer | 428/129 |
| 2,314,876 A | * | 3/1943 | Greene | 428/34.3 |
| 2,642,372 A | * | 6/1953 | Chittick | 428/134 |
| 4,748,067 A | * | 5/1988 | Cline | 428/186 |
| 4,832,228 A | | 5/1989 | Hickey | |
| 5,558,924 A | * | 9/1996 | Chien et al. | 428/181 |
| 5,733,403 A | * | 3/1998 | Morley | 156/207 |
| 5,750,235 A | * | 5/1998 | Yoshimasa | 428/182 |
| D412,604 S | | 8/1999 | Hickey | |

OTHER PUBLICATIONS

Schleicher & Co. of America, Inc. Brochure for PacMate®, 1 page, date printed Mar. of 2000.

* cited by examiner

*Primary Examiner*—Donald J. Loney (57) ABSTRACT

A packaging laminate and method of production are demonstrated by using a single face corrugated cardboard. The single face corrugated cardboard is supplied in rolled form and is processed through a conventional corrugated cardboard shredder to create a flexible resilient packaging material. The method of manufacture is more efficient than conventional manual feeding of standard corrugated cardboard sheets through the shredder. Various embodiments of the invention can be manufactured by adhesively bonding two or more packaging laminates and by the addition of a support layer.

15 Claims, 9 Drawing Sheets

PRIOR ART

PACKAGING LAMINATE AND METHOD

FIELD OF THE INVENTION

The invention herein pertains to packaging materials and particularly pertains to packaging materials made from paper laminates.

DESCRIPTION OF THE PRIOR ART AND OBJECTIVES OF THE INVENTION

Filler-type packaging materials have been used for many years to protect various items during handling and shipping. New and recycled paper, wood and plastics have all been used in various configurations to guard and shield goods contained in boxes from sharp impacts. It is usual in the industry to shred paper and cardboard sheets to provide a matrix which is easy to use in packing delicate items. Various types of shredding machines have been manufactured in the past such as the PACKMATE® as manufactured by Schweitzer and Company of America, Inc. of Sanford, N.C. This type of shredder both slits and crushes corrugated cardboard and other paper sheets by converting such sheets into "mats". These mats can be easily contoured to a delicate article placed in for example, a carton for shipping purposes. Such corrugated sheets, usually derived from used corrugated boxes, have a top and a bottom planar surface or layer with a sinuous or corrugated inner layer. The mats produced therefrom are somewhat stiff but are more flexible and have less height than before shredding due to slitting and the pressure applied during the shredding process as illustrated herein.

Another popular type of paper packaging material is formed by using sheets of kraft paper of suitable size. The edges of the sheets are folded to the middle to form three (3) concentric tubes which are then inserted into a conventional machine which "pinches" by roller action. The center of the folded paper is then adhered mechanically to form a flat, tubular like packaging material which can then be placed around articles in a box or other container for impact absorption during transportation.

The packaging materials formed as discussed above have many uses, however each has the disadvantage of being somewhat "boardy" or "stiff", making them difficult to closely shape to small, delicate articles. In addition, a typical corrugated cardboard shredder generally requires hand-feeding of the corrugated stock since rigid sheets of corrugated cardboard are processed.

Thus with the disadvantages and problems associated with prior art packaging materials and methods for forming such, the present invention was conceived and one of its objectives is to provide a method of forming a flexible, very adaptable laminated packaging material which is relatively simple and efficient to manufacture using conventional equipment.

It is still another objective of the present invention to provide a laminated packaging material which is resilient, and can be conformed to relatively small, delicate articles to ensure safety and prevent impact damage.

It is yet another objective of the present invention to provide a method of processing laminated packaging material from laminated stock in roll form.

It is also another objective of the present invention to provide a method of manufacturing packaging material using a two-ply kraft laminate having a planar layer and a sinuous layer.

It is still another objective of the present invention to provide a packaging material which can be varied by adhering different numbers of layers, depending on the packaging material desired for specific requirements.

It is yet, still another objective of the present invention to provide a packaging material in sheet form which is inexpensive to manufacture and is readily adaptable to small articles using conventional shredding and other equipment.

It is a further objective of the present invention to provide a method for producing laminated packaging materials from standard rolled two-ply corrugated stock.

Various other objectives and advantages of the present invention will become apparent to those skilled in the art as a more detailed description is set forth below.

SUMMARY OF THE INVENTION

The aforesaid and other objectives are realized by providing a process for the manufacture of a multi-ply laminate packaging material from two-ply rolled corrugated stock. The rolled stock consists of a single face corrugated kraft paper which is fed from a mandrel into a conventional sheet shredder where it is processed and exits therefrom for cutting into convenient lengths. As the rolled stock is of the single face corrugated type, the sinuous layer is distorted into wave-like rows and columns having alternating heights during processing. Also, slitting of the first sinuous and second planar layer during processing lessens the stiffness of the prepared packaging material and when combined with the characteristics afforded by the alternating wave-like projections, creates a very flexible and resilient packaging laminate, much more so than can be achieved with shredding usual corrugated cardboard sheets.

BRIEF DESCRIPTION OF THE DRAWINGS

Without regard to scale and for demonstrative purposes.

DETAILED DESCRIPTION OF THE PREFERRED EMBODIMENT AND OPERATION OF THE INVENTION

Figure 1:
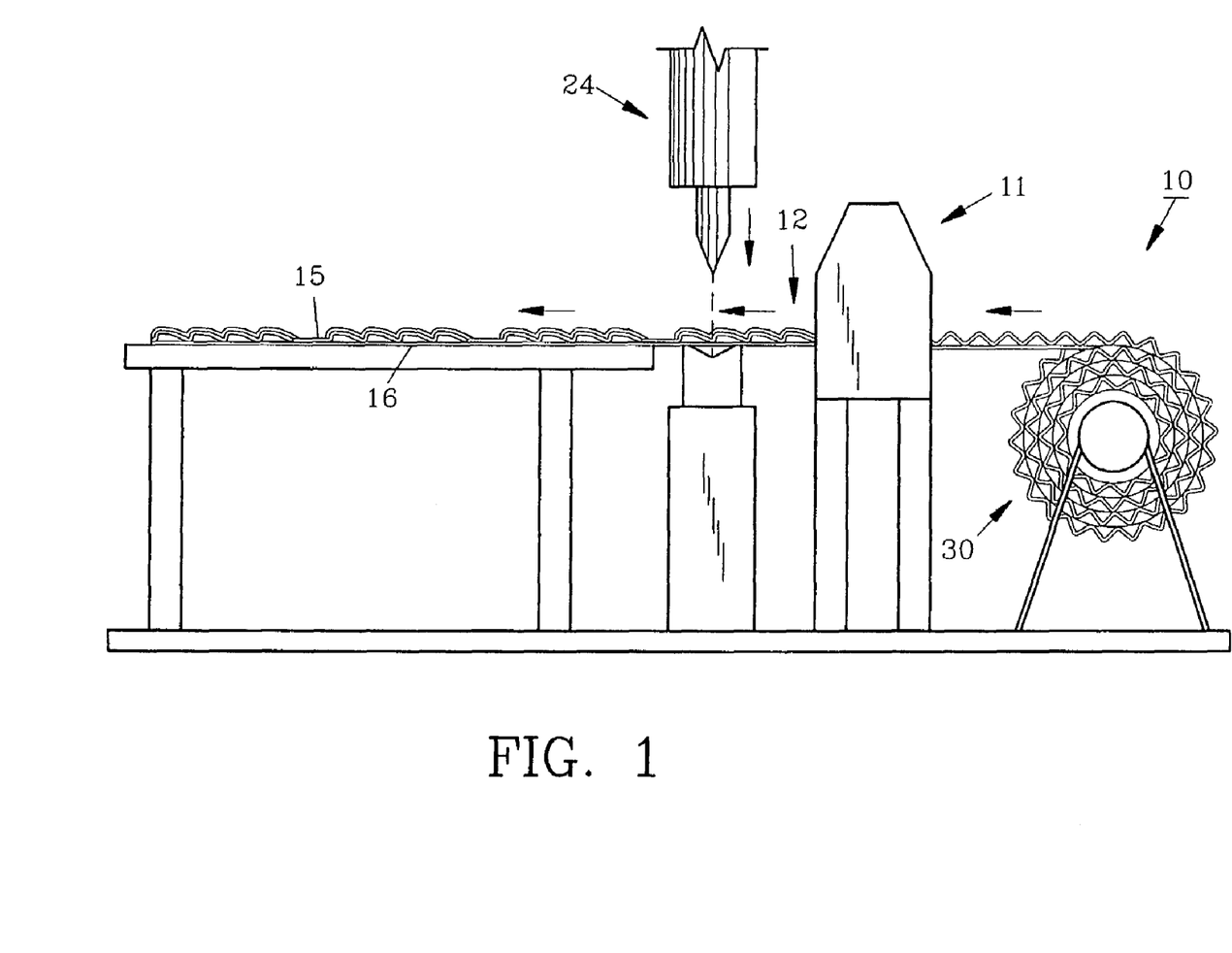
FIG. 1 illustrates in schematic fashion the method of the invention for manufacturing the laminated packaging material.

For a better understanding of the invention including the method described herein, turning now to the drawings, FIG. 1 illustrates the preferred method of manufacturing a packaging laminate in which a roll of standard, single face corrugated cardboard 10 in roll form is fed from mandrel 30 into standard shredder 11 such as a PACKMATE® shredder by Schweitzer and Company of America, Inc. of Sanford, N.C. Shredder 11 is used by businesses and industries for typically shredding standard corrugated cardboard sheets, such as sections of used corrugated cartons to form a packaging laminate or "mat".

Figure 2:
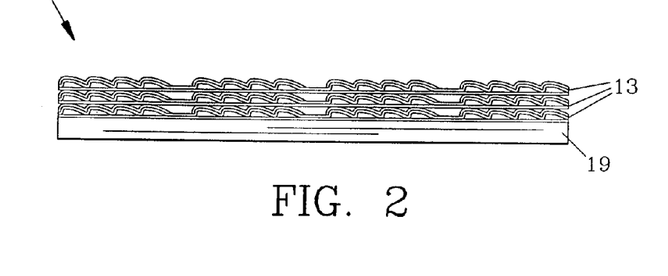
FIG. 2 features a stack of packaging laminates as formed by the process of FIG. 1.

Due to the single face of corrugated cardboard 10 as shown in the preferred method as illustrated in FIG. 1, the results of shredder 11 are different and produces a different continuous processed laminate 12, which is then cut into convenient size mats or laminate 13 as shown stacked on wooden pallet 19 in FIG. 2. Cutter 24 is illustrated by way of schematic representation only and may be for example a typical guillotine knife, laser knife or other cutting apparatus for laminated paper as are commonly used in the industry.

Figure 3:
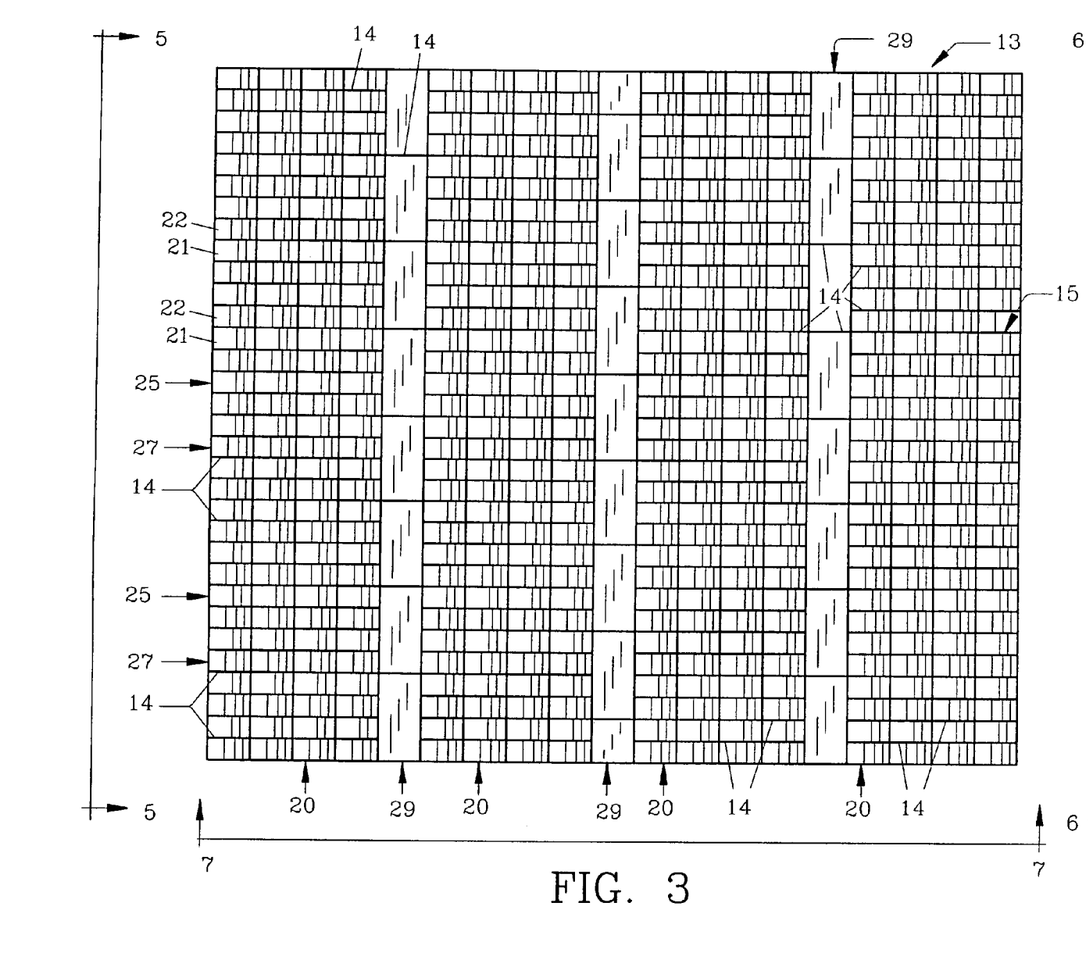
FIG. 3 shows an enlarged top plan view of one of the packaging laminates as depicted in FIG. 2.
Figure 4:
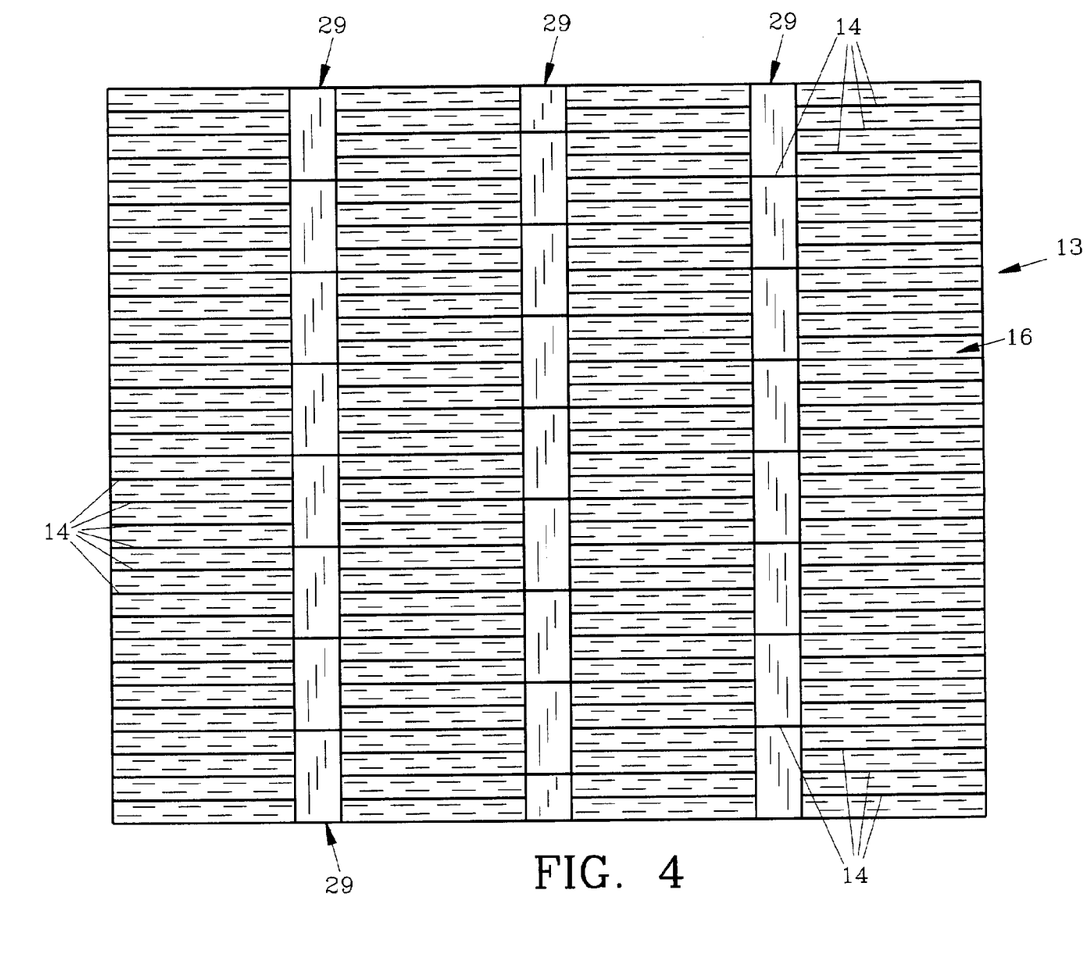
FIG. 4 pictures an enlarged bottom plan view of the laminate shown in FIG. 3.

The top view of packaging laminate 13 is shown in FIG. 3 whereas FIG. 4 illustrates a bottom plan view thereof. Laminate 13 has various slits 14 therein shown in the longitudinal or first direction. Slits 14 penetrate both first layer 15 and second layer 16 of laminate 13 as shown in FIGS. 3 and 4 to form coincidental slits therealong. As shown in larger scale in FIG. 7, packaging laminate 13 includes rows 20 extending in a lateral or second direction consisting of tall wave-like projections 21 and shorter wave-like projections 22 each having similar slanted/sawtooth shapes with offset crests 21', 22' respectively advanced along the first direction as best illustrated in FIGS. 5 and 6.

Figure 7:
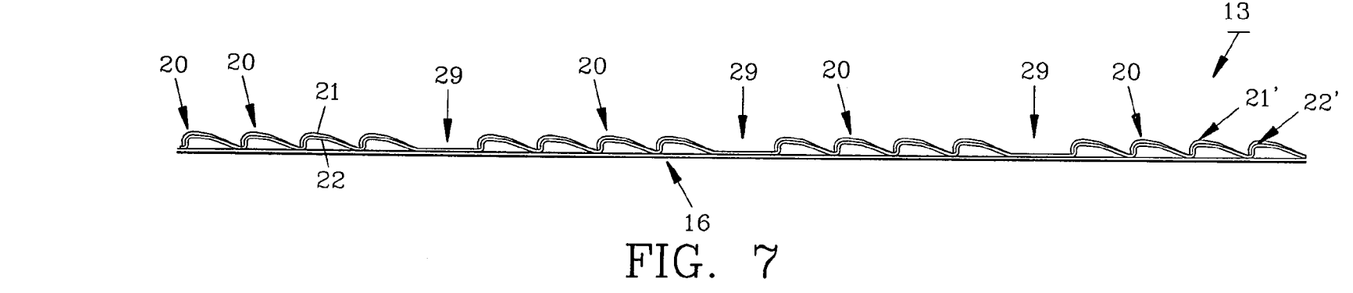
FIG. 7 demonstrates an enlarged side elevational view of the laminate as shown in FIG. 3.

In FIG. 3, lateral rows 20 of wave-like projections 21, 22 are shown extending across the entire upper surface of packaging laminate 13 with slits 14 between columns 25 of propagating projections 21 and columns 27 of propagating projections 22 which extend in the longitudinal or first direction. Shredder 11 also substantially flattens projections 21, 22 and places a series of channels or flattened rows 29 therealong in the lateral or second direction as shown in FIGS. 3, 4 and 7.

Figure 5:
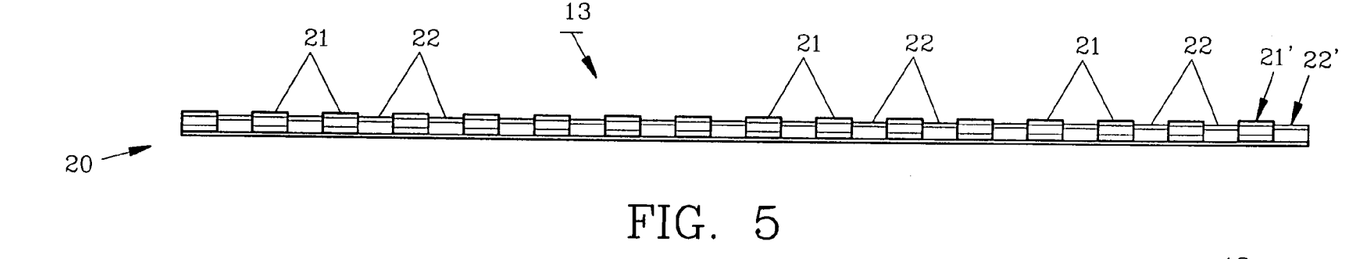
FIG. 5 depicts an enlarged front elevational view of the laminate as shown in FIG. 3 along lines 5—5.
Figure 6:
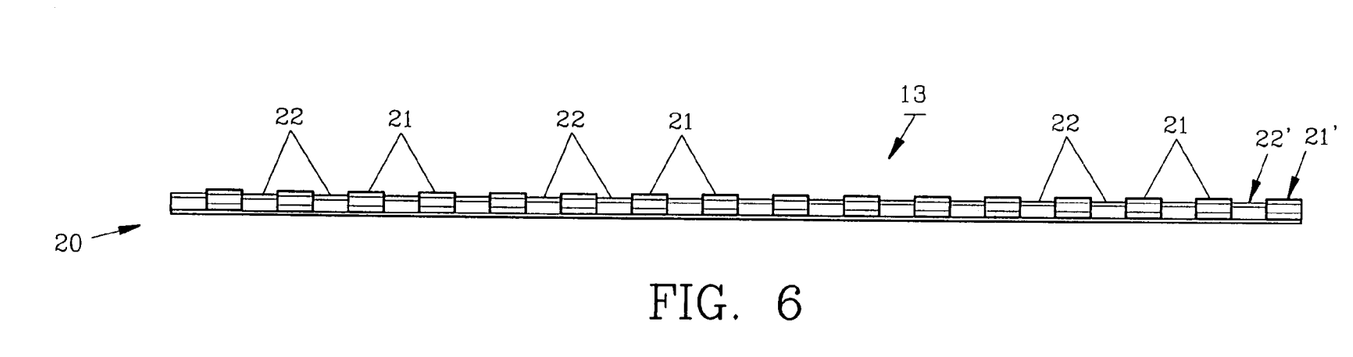
FIG. 6 illustrates an enlarged rear elevational view of the laminate as shown in FIG. 3.

The height difference of taller wave-like projections 21 and shorter wave-like projections 22 due to shredder 11 as shown in FIGS. 5 and 6 provides for a unique configuration and confrontation with an article such as a fragile (shock sensitive) article (not shown) requiring a high degree of impact protection. Packaging laminate 13 is more resilient and flexible than conventional typical shredded corrugated cardboard as illustrated in FIGS. 11–14, due in part to the lack of a uniform upper surface created by the difference in the height of the wave-like projections 21, 22 and also due in part to the lack of the planar upper layer as with usual shredded corrugated cardboard mats.

Figures 15, 16, 17:
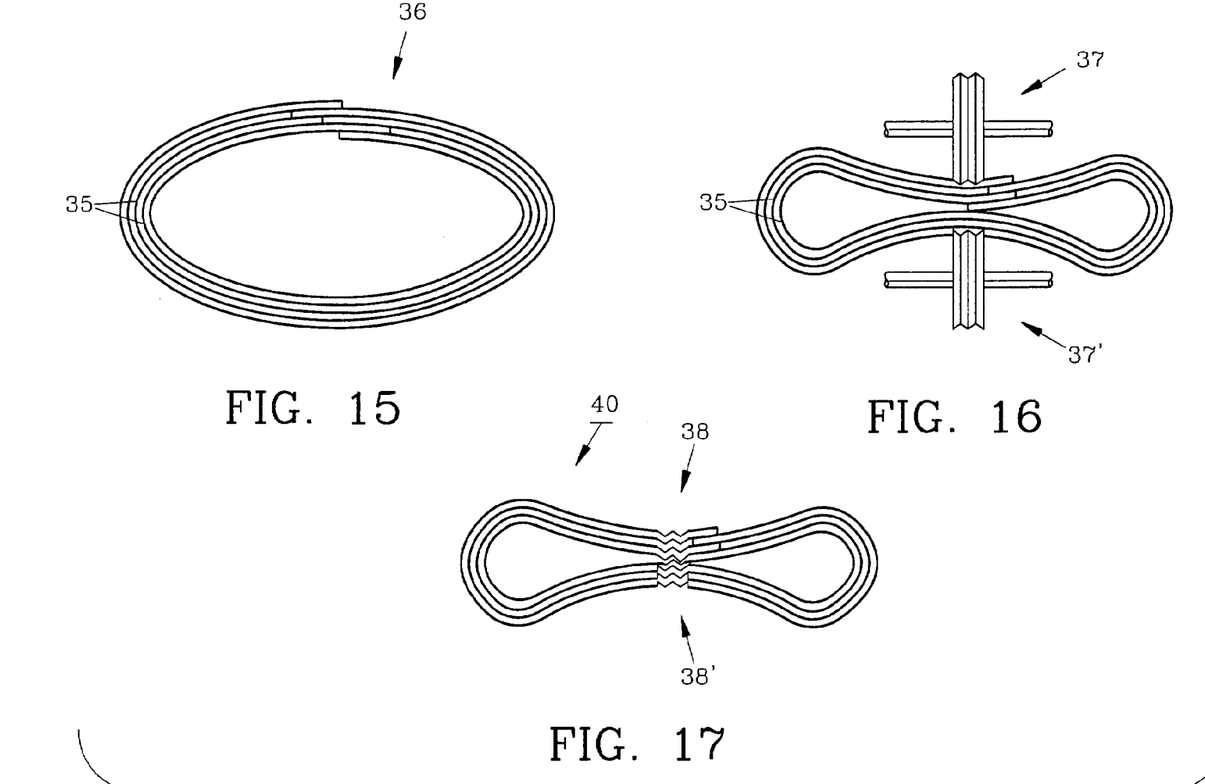
FIG. 15 illustrates an end view of the three-ply configuration of kraft paper sheets.
FIG. 16 shows a standard forming process for the manufacture of conventional kraft paper packaging materials.
FIG. 17 demonstrates an end view of the product produced from the method illustrated in FIG. 16.

Packaging laminate 13 provides greater impact resistance than conventional folded kraft paper tubular laminate 40 as illustrated in FIGS. 15–17. As seen, three (3) sheets of typical kraft paper 35 are typically folded along a longitudinal axis into tubular configuration 36 and are then processed through a pair of pinch rollers 37, 37'. In FIG. 16, pinch rollers 37, 37' then swage kraft sheets 35 together at areas 38, 38' to "mechanically" bind sheets 35 into a distorted 8-shaped tube as seen in FIG. 17. Tubular laminate 40 is difficult to use in packaging small, delicate items and does not have the flexibility and resiliency of packaging laminate 13, as shown in FIGS. 2–4.

Figure 8:
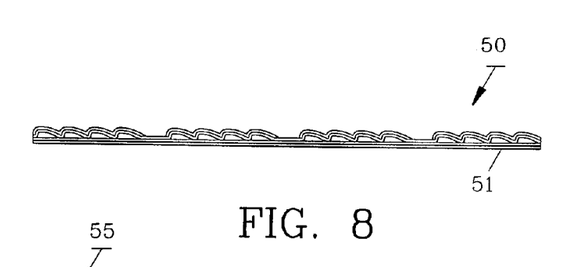
FIG. 8 shows a diminished sectional side view of a laminate as seen in FIG. 7 with an added base layer.

In FIG. 8, a first alternate embodiment of the invention is illustrated in which packaging laminate 50 is shown. Laminate 50 is supported by the addition of bottom layer 51, such as with an adhesive, to packaging laminate 13 as shown in FIG. 3. Layer 51 may be for example a sheet of kraft paper, cardboard stock or otherwise for support. Packaging laminate 50 can then be positioned along the bottom or sides of a typical shipping carton where extra strength and impact resistance is needed.

Figure 9:
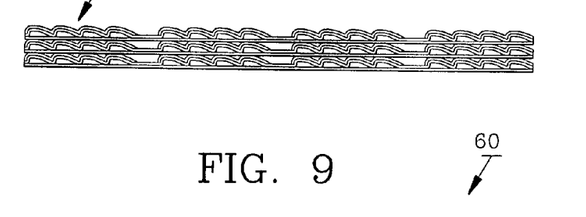
FIG. 9 features a diminished multi-ply laminate formed by adhering three (3) laminates as shown in FIG. 6.

In FIG. 9 another alternate embodiment of the invention is seen with multi-ply packaging material 55 which is formed such as by adhesively adhering (with a conventional glue) two or more layers of preferred packaging material 13 (as shown in FIG. 3). Multi-ply packaging laminate 55 is shown with three (3) layers and would be effective for use generally with larger articles which require impact protection but not requiring the degree of flexibility of packaging laminate 13.

Figure 10:
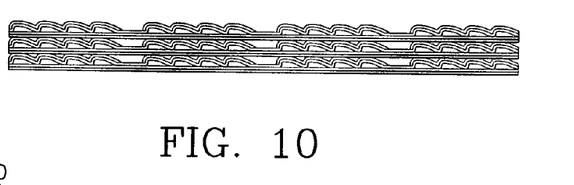
FIG. 10 demonstrates a diminished multi-ply laminate utilizing the packaging laminate embodiment as seen in FIG. 8.
Figure 11:
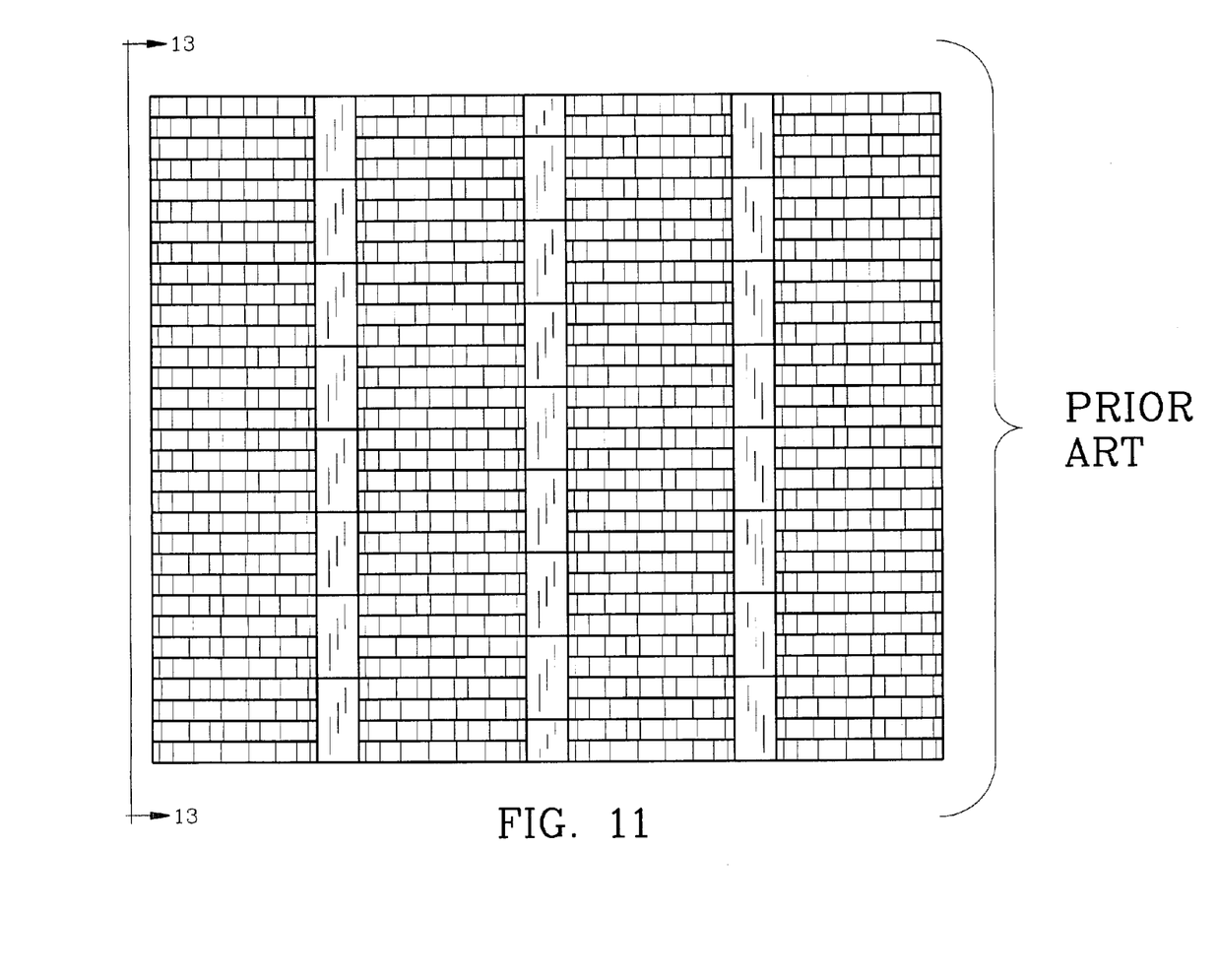
FIG. 11 illustrates a top plan view of a conventional shredded corrugated cardboard sheet.
Figure 12:
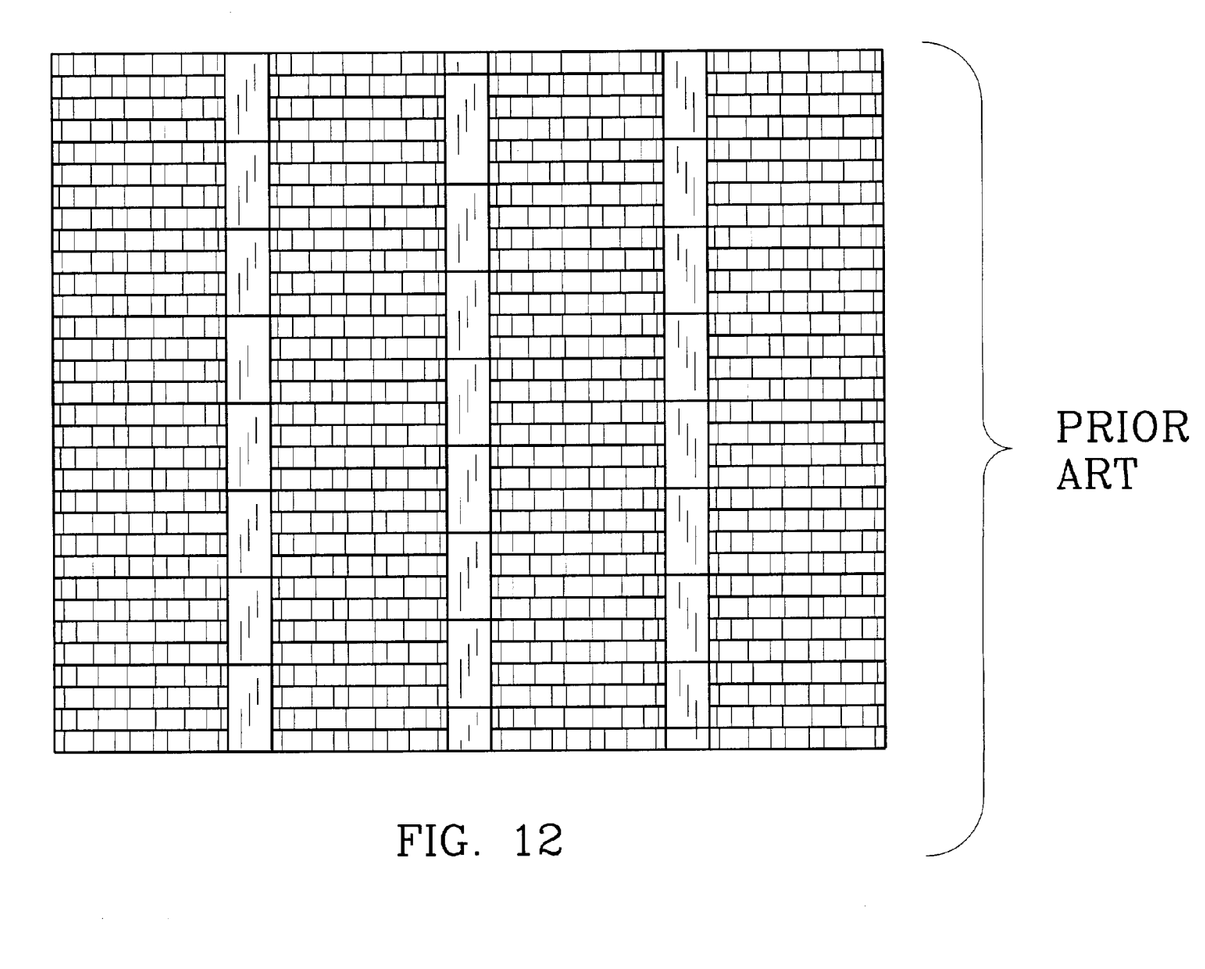
FIG. 12 depicts a bottom plan view of the shredded sheet shown in FIG. 11.
Figure 13:
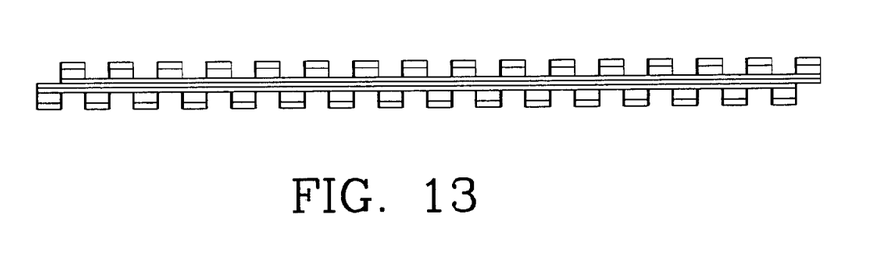
FIG. 13 demonstrates an end view of the sheet as shown in FIG. 11 along lines 13—13, it being understood that the opposite end view would be a mirror image thereof.
Figure 14:
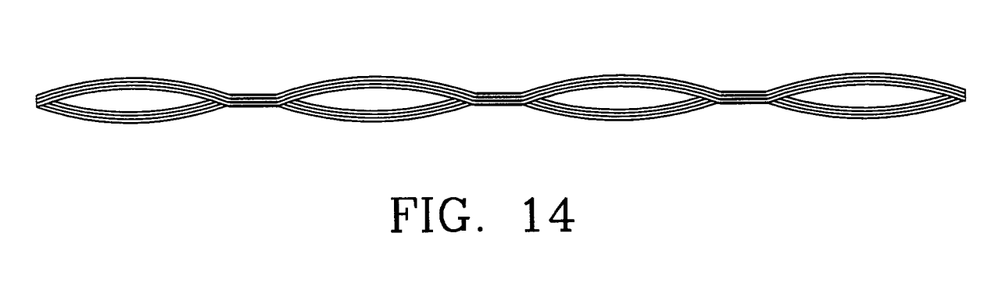
FIG. 14 pictures a side elevational view of the laminate shown in FIG. 11.

A further alternate embodiment of the invention is shown in FIG. 10 whereby packaging laminate 60 is seen, which again is of the multi-ply type. Here, three (3) layers of a packaging laminate such as packaging laminate 50 shown in FIG. 8 are adhesively adhered, should a more rigid or stiffer packaging laminate be required such as for very large, heavy objects.

The illustrations and examples provided herein are for explanatory purposes and are not intended to limit the scope of the appended claims as various configurations can be manufactured as needed for particular packaging solutions.

I claim:

1. A packaging laminate comprising: a first layer, a planar second layer, said first layer attached atop said second layer, said first layer comprising wave-like projections, said wave-like projections positioned in first and second columns and slanted in a first direction along said first layer, each of said wave-like projections extending vertically from said second layer therebelow, said first column parallel with said first direction and with said second column, said first column comprising first wave-like-projections and said second column comprising second wave-like projections, said first wave-like projections having a height greater than said second wave-like projections.

2. The packaging laminate of claim 1 wherein said first layer defines a plurality of slits, each of said first layer slits longitudinally extending along said first layer in said first direction, said second layer defining a plurality of slits, each of said second layer slits coincidentally aligned with a different one of said first layer slits.

3. The packaging laminate of claim 1 wherein said first layer defines a series of channels, said channels extending in a second direction perpendicular to said first direction across said first layer, said channels spaced from said second layer, each of said channels spaced one from another and said channels positioned at the ends of said first and said second columns.

4. The packaging laminate of claim 1 further comprises a planar third layer, a fourth layer, said fourth layer comprising wave-like projections, said fourth layer attached to said second and said third layers.

5. The packaging laminate of claim 4 further comprises a planar fifth layer, a sixth layer, said sixth layer comprising wave-like projections, said sixth layer attached to said fifth and said third layers.

6. The packaging laminate of claim 1 wherein said wave-like projections are positioned in parallel alignment in a second direction perpendicular to said first direction, said wave-like projections comprising first and second wave-like projections, said second wave-like projections having a height less than said first wave-like projections and alternating between said first wave-like projections in said second direction.

7. The packaging laminate of claim 6 wherein said wave-like projections are positioned in a plurality of rows, said rows extending in said second direction, said first and said second wave-like projections alternatingly positioned along each of said rows.

8. The packaging laminate of claim 1 further comprises a planar third layer, said second layer attached to said third and said first layers.

9. The packaging laminate of claim 8 further comprises a fourth layer, said fourth layer comprising wave-like projections, said third layer attached to said fourth and said second layers, a planar fifth layer, and a planar sixth layer, said fifth layer attached to said fourth and said sixth layers.

10. The packaging laminate of claim 1 wherein said wave-like projections each comprise an offset crest, said crest advanced in said first direction.

11. The packaging laminate of claim 1 wherein said first layer defines a plurality of slits, each of said first layer slits longitudinally extending in said first direction through said first layer, said first layer slits positioned between said first and said second columns.

12. The packaging laminate of claim 1 wherein said first layer defines a plurality of slits, each of said first layer slits longitudinally extending along said first layer in said first direction, said first layer slits extending through said first layer.

13. The packaging laminate of claim 2 wherein said first layer slits extend through said first layer, said second layer slits extending through said second layer and in communication with said first layer slits.

14. The packaging laminate of claim 7 wherein said first layer defines a series of channels, each of said channels comprising flattened projections.

15. A packaging laminate comprising: a first layer, a planar second layer, said first layer attached to said second layer, said first layer comprising wave-like projections, said wave-like projections propagating in columns along said first layer in a first direction, said wave-like projections comprising first and second wave-like projections, said second wave-like projections having a height less than said first wave-lice projections and alternating between said first wave-like projections in a second direction perpendicular to said first direction across said first layer, said first layer defining a series of channels extending in said second direction, said channels each comprising flattened projections.

* * * * *